United States Patent [19]

Geist et al.

[11] 3,964,910

[45] June 22, 1976

[54] PRINTING OF DEEP DRAWN CONTAINERS WITH IMAGES REFLECTED FROM INSIDE OF CYLINDER

[75] Inventors: Robert Geist, Kempten; Franz Benedikt Rudolph, Hamburg, both of Germany

[73] Assignee: Lever Brothers Company, New York, N.Y.

[22] Filed: Dec. 13, 1974

[21] Appl. No.: 532,444

[30] Foreign Application Priority Data

Dec. 20, 1973 Germany ........................... 2363551

[52] U.S. Cl. .................................. 96/46; 96/27 R; 96/27 E; 355/47; 355/49; 355/52; 355/66

[51] Int. Cl.² .................. G03C 11/00; G03B 27/58; G03B 27/48; G03B 27/50

[58] Field of Search .................... 96/46, 27 R, 27 E; 355/52, 47, 49, 66

[56] References Cited

UNITED STATES PATENTS

| | | | |
|---|---|---|---|
| 2,607,268 | 8/1952 | Bartz | 96/46 |
| 2,617,337 | 11/1952 | Snyder | 96/46 |
| 3,238,909 | 3/1966 | Kendall | 96/46 |
| 3,582,331 | 6/1971 | Howe | 96/46 |
| 3,785,819 | 1/1974 | Barnes et al. | 355/52 |

*Primary Examiner*—Edward C. Kimlin
*Attorney, Agent, or Firm*—Arnold Grant

[57] ABSTRACT

A method of producing a distorted artwork image printed on flat stock material which when deep drawn to the desired shape stretches the distorted artwork image to provide the desired artwork image on the finished article in which the original artwork can be an original picture or photograph on opaque material. The original artwork is formed into a closed cylinder with the artwork on the inner walls and photographed as reflected from the cylinder by a generally conically shaped mirror arranged co-axially with the cylinder so that a distorted artwork image can be produced which will extend over the whole area of the flat stock material to be subsequently deep drawn.

5 Claims, 9 Drawing Figures

PRINTING OF DEEP DRAWN CONTAINERS WITH IMAGES REFLECTED FROM INSIDE OF CYLINDER

This invention relates to improvements in or relating to the printing of deep drawn containers and particularly to the printing of containers deep drawn from plastics sheet material.

During deep drawing of a sheet of plastics material the material is stretched and if the sheet is printed the printed image is also stretched in the same way as the material itself. This stretching of the printed image can be compensated for by printing the flat sheet with a distorted image which is corrected by by the deep drawing step to give the desired image on the finished article.

To obtain the image to be printed in distorted form one method used hitherto was to produce an unprinted container, decorate the container and then shrink the decorated container back to the flat sheet form by heating. The flat sheet showed a distorted image on the basis of which printing rolls were produced.

Another method was to deep draw a flat sheet printed with a regular lattice and design the image to be printed on the sheet according to the change in the lattice.

These methods are however relatively inaccurate and suitable only for simple illustrations such as lettering, line copy or surfaces of the same colour.

U.S. Pat. No. 3,238,909 discloses an optical system for the production of a distorted image which can be printed on flat stock material and subsequently deep drawn to the finished shape to have the desired artwork image on the finished container. One of the systems described in this specification comprises photographing an image of a negative film wrapped around a glass cylinder and reflected into a camera by an annular conical mirror arranged outside of the cylinder. The photographed image is then reproduced on the flat stock material. This system has a number of disadvantages, namely that when the artwork is to be continuous around the containers the ends of the negative must not overlap on the glass cylinder and it is extremely difficult to butt the two ends of the negative together without this join being noticeable in the finished containers. Also it is not possible in one step to photograph artwork which is to extend across the whole surface of the finished container since the glass cylinder will always appear as a blank area in the photographed image. Furthermore the problems of evenly illuminating the negative through the glass cylinder are expensive to solve expecially when it is desired to use colour negative film.

According to the present invention there is provided a process for producing a distorted artwork image on flat stock material, the distorted artwork image being such as to provide the desired artwork image after being stretched by deep drawing the flat stock material into the desired shape, comprising the representing the original artwork on the inner walls of a cylinder, photographing a distorted image of the artwork as reflected from the cylinder by a mirror arranged co-axially within the cylinder and printing the distorted image on the flat stock material.

In this way the disadvantages of the system referred to above are avoided. Firstly the original artwork can be a picture or photograph which is formed into a cylinder and the ends overlapped to form a continuous original artwork without the overlapping being noticeable in the finished product. Secondly because the mirror is arranged within the cylinder the photographed image can comprise artwork over the whole area of the image which corresponds to the area of the blank to be deep drawn. Also the problems of illuminating the picture are simpler and can be solved using the usual studio equipment.

When the deep drawn container has the shape of a body of rotation the original artwork is represented on the inner walls of a right circular cylinder but the method of the present invention is equally suitable for other shapes of finished container, the original artwork then being represented on the inner walls of a polygonal or other shaped cylinder.

The photograph is perferably taken with a reproduction camera having a long focal length lens, the camera being set about 1 metre from the mirror and a small aperture used so that the depth of field of the lens compensates for the different distances of the points being photographed. Where possible the image produced on the film by the camera should have the same dimension as that to be printed on the flat sheet to avoid loss of accuracy during any subsequent copying of the distorted image to the desired size. The use of film in the camera to provide a colour transparency is also preferred, thus ruling out the need for reversal processes which are necessary when a negative film is used so that here again errors and inaccuracies which might occur are avoided.

From the colour transparency individual colour separations are made and the colour separations can be corrected in intensity according to the stretching of the image during deep drawing, and the colour corrected images from the colour separations printed successivly on the flat stock material to provide the distorted artwork image.

For the printing of the sheet it is preferable to use gravure printing as this process is best suited for the reproduction of a colour photograph with its various colours, half tones and depths. It also permits the strengthening or weakening of contrasts. In particular half tone dots with a very think ink film can be transferred to the sheet by an appropriately deeper etching of the cells of the impression cylinder. It is necessary for good distorted print as during the deep drawing process the half tone dots enlarge in area, while the thickness of the ink layer diminishes and the hue is lightened. Through the use of an optical correction mask the individual areas of a colour separation can be changed in brightness or intensity so that on the printing rolls or impression cylinder those areas which are stretched most during deep drawing can be etched more deeply than what would actually correspond to the photographed image. The correction masks are expediently the same for all of the colour separations of a picture or of a container and have zones of varying light intensity corresponding to the zones of varying degrees of stretching. Transparent filters or plates with grey or black tinting can be used as correction masks.

When deep drawing plastics material into a desired final shape the material does not stretch evenly in all areas, some parts of the flat material being stretched more than others. It is therefore most advantageous that different parts of the reflecting surface of the mirror are inclined at different angles to the axis of the cylinder, those areas of the distorted image which are stretched the most during deep drawing being reflected in parts of the mirror aligned more closely to the mirror axis than other parts of the mirror. It will be understood that the closer the mirror surface is aligned to the axis of the cylinder the greater is the foreshortening of the photographed distorted image.

The necessary mirror shape can be determined by printing a flat sheet with a line pattern, deep drawing the blank under production conditions to the desired final shape, determining the amount of stretch of the material in a meridian section by comparing the distances between the original line pattern and the distances between the stretched line pattern of the deep drawn container, plotting the stretched distances on one axis against the original distances on a second axis and determining the mirror shape such that the reflecting surface reflects light rays from points on the one axis to respective points on the other axis.

The original distances are preferably plotted so that the reflected rays converge towards a focal point.

The invention will now be more particularly described with reference to the accompanying diagrammatic drawings in which FIG. 1 shows a line pattern made up of concentric equidistant circles on a flat sheet;

Figure 1:
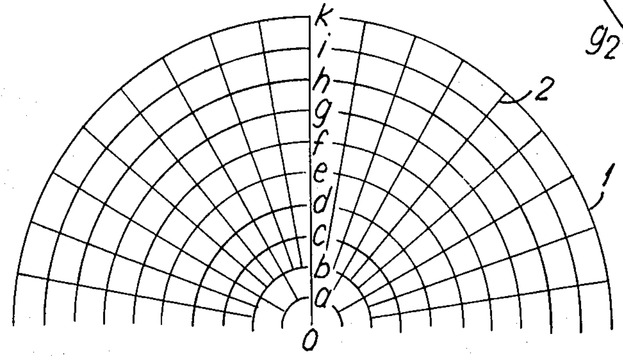

In order to determine the shape of the mirror element for a container having the shape of a body of rotation a line pattern is first printed on the sheet as shown in FIG. 1. This line pattern corresponds in size to the size of the blank to be deep drawn and comprises a number of concentric equidistant circles 1 and for control purposes radial lines 2. For other shapes of containers other line patterns are in principle possible.

Figure 2:
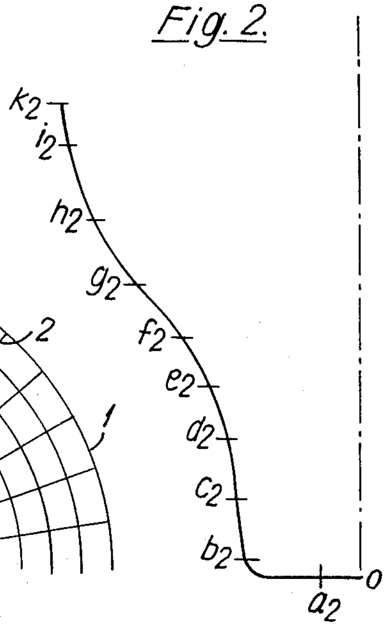
FIG. 2 shows the meridian section of a container deep drawn from the sheet of FIG. 1.

The printed sheet is deep drawn under production conditions to the desired shape of container. The meridian section of a container deep drawn from the blank of FIG. 1 is shown in FIG. 2 from which it can be seen that the equal distances between the circles 1 numbered a to k on the sheet of FIG. 1 have now each been altered to varying extents by the deep drawing operation. The production conditions of deep drawing the blank to the desired shape of container are selected in such a way that the desired wall thickness distribution for the container and the varying degrees of stretching in the various zones are reproducible. This can be achieved by adhering to precise values for eg the heating of the sheet, rate of mechanical stretching and the pneumatic final shaping of the containers etc. In the meridian section shown in FIG. 2 the equidistant concentric circles *a* to *k* of FIG. 1 are now represented as contour lines *a*2 to *k*2. The central point O of the circles is in the centre of the bottom of the container and the outer circle k bounds the outermost diameter of the container and the boundary line between the shaped container and the flat sheet. Along this contour *k* the container can be cut from the sheeting, the circle *k*2 representing the top edge of the container.

Figure 3:
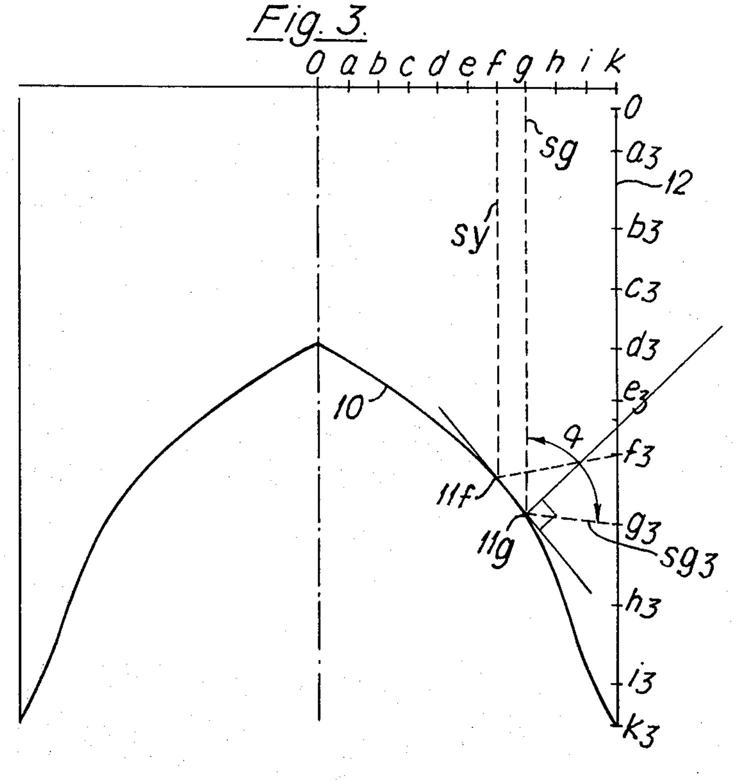
FIG. 3 illustrates the design of the mirror element.

As shown in FIG. 3 the points O to *k* are plotted along one axis at equal intervals corresponding to those of FIG. 1 and the points O to *k*3 are plotted along the other axis at the intervals produced by the deep drawing of the blank to the shape shown in FIG. 2. Thus the total distance from O to *k*3 is equal to the distances O to *k*2 of FIG. 2 and thus corresponds to the stretched length of the meridian section of the container.

In the co-ordinates system a number of parallel lines are plotted through the points O to *k* running in the direction in which the image is reflected from the mirror to the camera, ie in the direction in which the distances of the stretched distances O to *k*3 are plotted. An arbitrary line is drawn to meet one of these lines (eg through *g*) from a corresponding point on the other axis (eg from *g*3). Through the point of intersection 11 of the two lines an element of the mirror curve 10 is constructed in such a way that a line *sy* perpendicular to the mirror element at this point 11g bisects the angle $\alpha$ between the lines *sg* and *sg*3. In this way the angle of incidence of the one line *sg*3 from *g*3 is equal to the angle of reflection of the other line *sg* from the mirror through *g*.

The point of intersection 11*f* of the lines through *f* and from *f*3 next to the point of intersection 11*g* is assumed according to the slope of the curve 10 established at point 11*g*, if necessary a correction being made so that at this point of intersection 11*f* the angle of incidence and the angle of reflection are again equal and a continuous mirror curve 10 is produced.

The illustrations of FIG. 1 to 3 show not only an arrangement for designing the mirror curve but also indicate that a motif on the original artwork at 12 between *g*3 and *f*3 is distorted to an extent corresponding to the distance between the circles *g* and *f* and stretched during deep drawing of the sheet to such an extent that in the container it lies between the contour lines *g*2 and *f*2.

Figure 4:
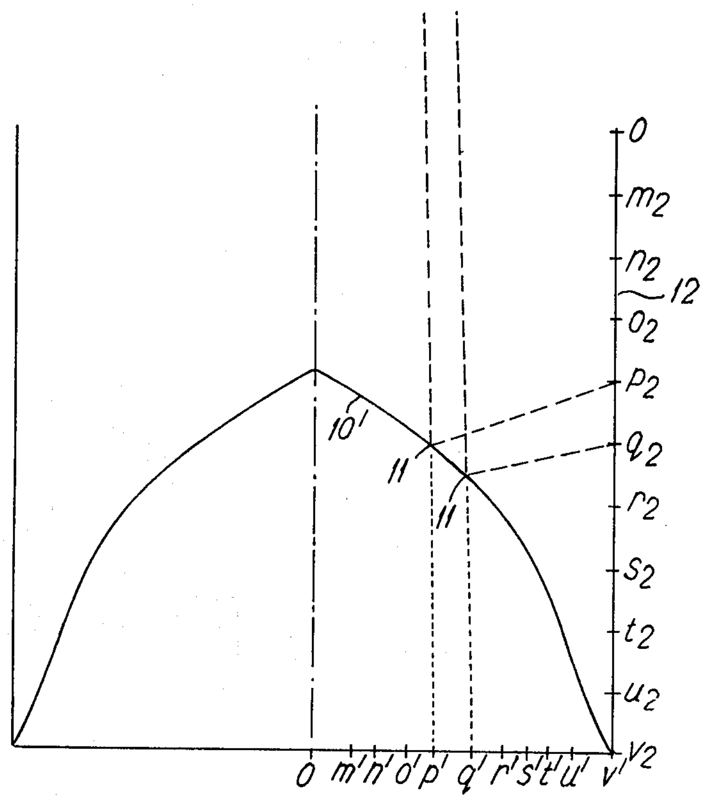
FIG. 4 illustrates the reflection of an original photograph in the mirror element of FIG. 3.

The mirror element 10 of FIG. 3 represents a simple case of designing the mirror element with rays which are parallel to the camera. In practice parallel rays do not occur and the image is photographed with a slight lack of definition, particularly on its outside edge. In order to produce a good photograph it is expedient to focus these rays towards the aperture 14 of the camera 15 shown in FIG. 6. Focussing of the reflected rays can be achieved by an appropriate design of the mirror 10, for instance by using converging rays through the points O to *k* in FIG. 3 as shown in FIG. 4. The method of constructing the mirror shape is in both cases basically the same with, however, the difference that instead of employing parallel rays through points O to *k* as shown in FIG. 3, the rays in FIG. 4 are all converging towards the desired focal point. This focal point coincides with the focal point of the optical system of the camera.

Instead of the point by point construction and subsequent smoothing of the mirror shape, the method of the invention can also be used to calculate the curved shape mathematically using the same perimeters eg by the Runge-Kuta method of integration.

It will be understood that the first construction line, in the above example the ray through *g*3, can be chosen arbitrarily in any number of directions so that an infinite number of different mirror curves are possible, all of which meet the necessary conditions and are optically suitable for the method of reproduction. In practice, from the many possibilities a suitable mirror is chosen which can be produced with as little work and material as possible and largely excludes reflection of the light source illuminating the picture into the camera when the picture is being taken.

Figure 5:
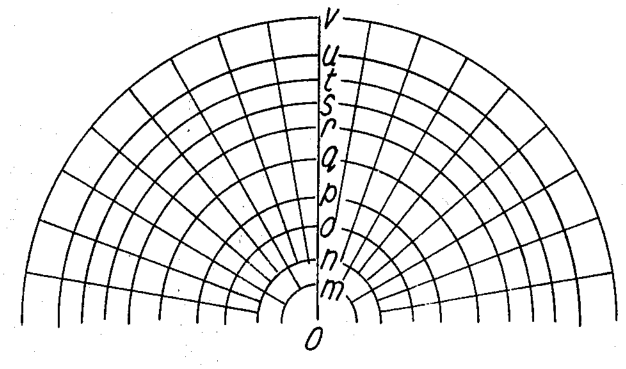
FIG. 5 shows a distorted image as reflected by the mirror element of FIG. 4.

FIG. 4 shows the reflection from a mirror element 10 which is so designed that it focusses the rays towards the camera. A motif on the original artwork, eg a coloured ring between *p*2 and *q*2, is distorted on the colour transparency on the image to be printed to the circular ring between $p'$ and $q'$ in FIG. 5. The mirror curve 10' is essentially constructed as in FIG. 3 but here the rays through the points O to $v'$ are not parallel but converge in accordance with the chosen distance to the aperture of the camera. The radius O to $v'$ of the mirror element does not have to be equal to the radius O to $v$ of the colour transparency. On the contrary it is expedient to select the reflected mirror image in such a way that it is greater and photograph the distorted image in the size which the image for printing is to hand.

If the process illustrated is to be used on a container which does not have a rotationary symmetrical shape it must be repeated with different stretching conditions with several sections as in FIG. 2 and the mirror element must be designed accordingly.

Figure 6:
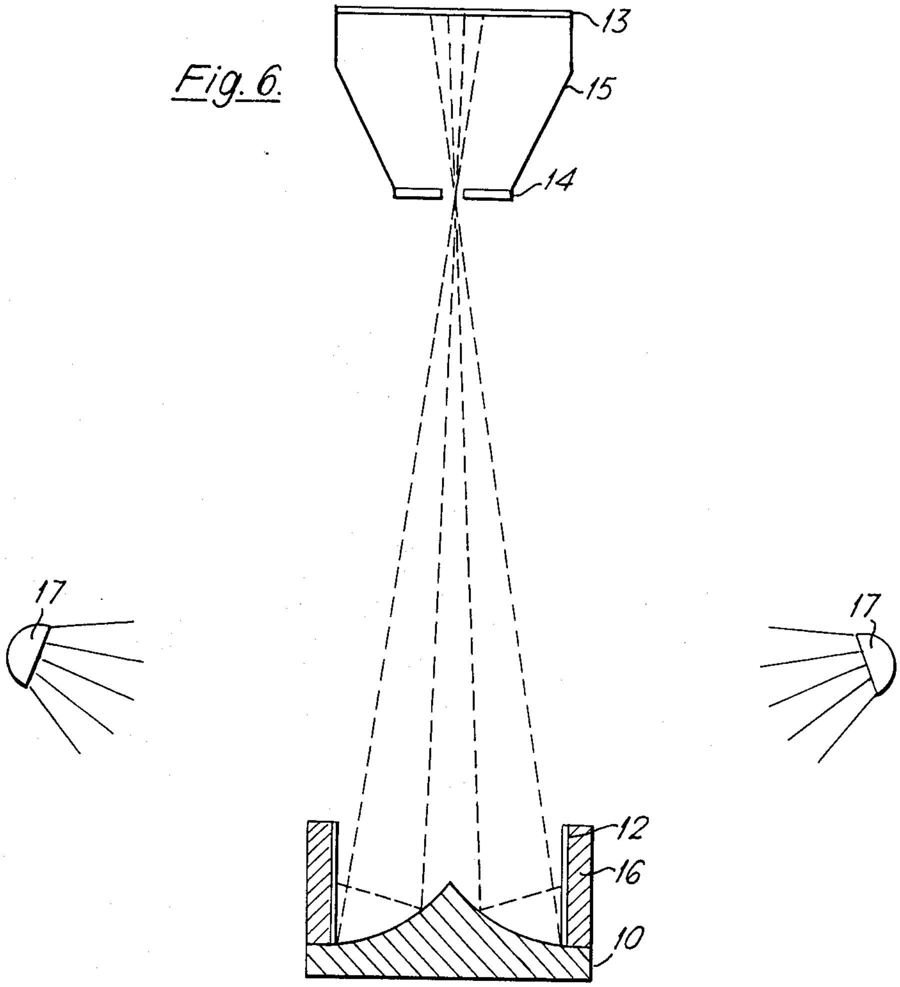
FIG. 6 shows the arrangement for photographing the distorted image.

FIG. 6 illustrates the operation of photographing the original artwork to provide a distorted image. The original 12 is placed around the mirror element 10 in the form of a cylinder supported by an upright cylindrical support 16. The original 12 is illuminated by the necessary number of lamps 17 in such a way that no reflection of light occurs from the mirror surface 10 into the camera lens. When the original 12 is a coloured original the lens system 15 of the camera is colour-corrected. The distorted photographed image 13 taken by the camera is preferably the size of the image to be printed on the flat sheet from which the containers are deep drawn. For the quality of the photograph it can be advantageous to make the diameter of the original 12 when folded to form a cylinder, and that of the mirror element 10, greater than the printed image. The original artwork can be any opaque original artwork, eg a colour photograph, and it is therefore easily retouchable. Lettering can also be incorporated in the original artwork 12 and photographed with it. Lettering to be reproduced on the bottom of the container can either be subsequently copied into the distorted photographed image or placed on a flat central portion of the mirror element and photographed simultaneously with the distorted image.

In principle the whole of the original artwork represented as the inner cylindrical walls can be transferred to the whole, particularly the outer, surface of the container deep drawn from the flat sheet. With flat container bottoms the representation of the upper edge of the original artwork coincides with a point in the centre of the bottom of the deep drawn container.

In addition to the abovementioned advantages of the method of the present invention a further advantage is that all colours and contours of the photographed image are kept together until the colour separations are prepared. This also permits, for example, retouching of the colour transparencies produced by the camera. In any event it means that optical errors such as those occuring as a result of varying colour refraction in individual lenses connected in series are avoided. The individual colour separations and subsequent printing rollers are produced in the way well known in the art but according to the invention the colour intensity can be corrected so that areas of the flat sheet to be stretched more than others are given a stronger hue than the original. This hue is then stretched during reshaping to the hue of the original artwork.

Figure 7:
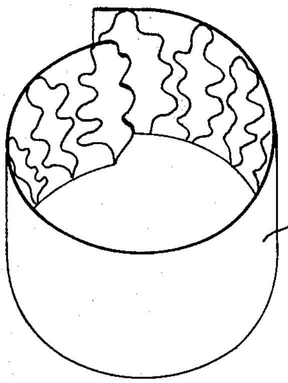
FIG. 7 shows the original artwork joined together to form a cylinder.

An original, showing a sample of various sheets, is illustrated in FIG. 7. One end of the annular loop is trimmed according to the contour of the picture and overlapped on the other end of the original artwork. This is possible with original artwork in the form of opaque pictures or photographs and produces an image running around the finished container which appears seamless.

Figure 8:
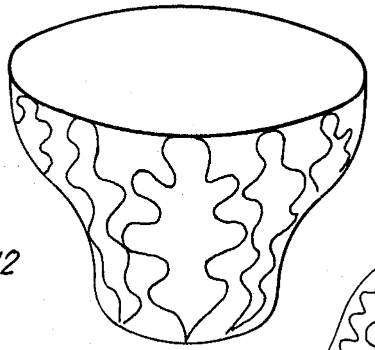
FIG. 8 is a perspective view of a container.
Figure 9:
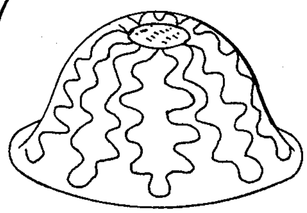
FIG. 9 is a perspective view showing the bottom of another container.

FIGS. 7 and 8 show two containers produced by the method of the present invention. In these containers the final artwork extends over the whole of the side walls and also over the bottom of the container and to the edge flange or top of the rim. The method of the present invention also provides for the production of a distorted printed image on a flat sheet corresponding to the shape of the container and the stretching conditions and for correction of the colour intensities for the print, particularly in conjunction with the gravure printing process to give an image on the deep drawn containers which is true in colour and shape and has the quality of a colour photograph with its richness in colours and half tones.

What is claimed is:

1. A process for producing a distorted artwork image on flat stock material, the distorted artwork image being such as to provide the desired artwork image after being stretched by deep drawing the flat stock material into the desired shape, comprising representing the original artwork on the inner walls of a cylinder, disposing a mirror co-axially within the cylinder, the mirror having a reflecting surface inclined to the axis of the cylinder, photographing a distorted image of the artwork as reflected in the mirror, and printing the distorted image on the flat stock material.

2. A method according to claim 1 in which the original artwork is multi-coloured, the distorted image being photographed on a colour film, individual colour separations made from the transparency, the colour separations being corrected in intensity according to the stretching of the image during deep drawing, and the colour corrected images printed successively on the flat stock material to provide the distorted artwork image.

3. A method according to claim 1 in which parts of the reflecting surfaces of the mirror are inclined at different angles to the axis of the cylinder, those areas of the distorted image which are stretched the most during deep drawing being reflected in parts of the mirror aligned more closely to the mirror axis than other parts of the mirror.

4. A method according to claim 3 in which the shape of the mirror element is determined by printing a flat sheet blank with a line pattern, deep drawing the blank under production conditions to the desired final shape, determining the amount of stretch of the material in a meridian section by comparing the distances between the original line pattern and the distances between the stretched line pattern of the deep drawn container, plotting the stretched distances on one axis against the original distances on a second axis and determining the mirror shape such that the reflecting surface reflects light rays from points on the one axis to respective points on the other axis.

5. A method according to claim 4 in which the original distances are plotted so that the reflected rays converge towards a focal point.

* * * * *